(12) United States Patent
Velichko (10) Patent No.: US 9,628,732 B2
(45) Date of Patent: Apr. 18, 2017

(54) IMAGING SYSTEMS AND METHODS FOR PERFORMING COLUMN-BASED IMAGE SENSOR PIXEL GAIN ADJUSTMENTS

(71) Applicant: Semiconductor Components Industries, LLC, Phoenix, AZ (US)

(72) Inventor: Sergey Velichko, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 175 days.

(21) Appl. No.: 14/460,966

(22) Filed: Aug. 15, 2014

(65) Prior Publication Data

US 2015/0054973 A1   Feb. 26, 2015

Related U.S. Application Data (60) Provisional application No. 61/869,433, filed on Aug. 23, 2013.

(51) Int. Cl.
| | |
|---|---|
| *H04N 5/369* | (2011.01) |
| *H04N 5/355* | (2011.01) |
| *H04N 5/3745* | (2011.01) |
| *H04N 5/232* | (2006.01) |

(52) U.S. Cl.
CPC ............. *H04N 5/369* (2013.01); *H04N 5/232* (2013.01); *H04N 5/3559* (2013.01); *H04N 5/37452* (2013.01); *H04N 5/37457* (2013.01)

(58) Field of Classification Search
USPC ...................................... 348/229.1
See application file for complete search history.

(56) References Cited

U.S. PATENT DOCUMENTS

| | | | |
|---|---|---|---|
| 6,627,474 B2 | 9/2003 | Barna et al. | |
| 7,518,646 B2 | 4/2009 | Zarnowski et al. | |
| 8,077,237 B2 | 12/2011 | Li | |
| 8,275,213 B2 | 9/2012 | Richardson | |
| 8,730,330 B2 | 5/2014 | Solhusvik et al. | |
| 2010/0188546 A1* | 7/2010 | McKee ................ | H04N 5/3559 348/308 |
| 2013/0027565 A1* | 1/2013 | Solhusvik ............. | H04N 5/335 348/187 |

* cited by examiner

*Primary Examiner* — Stephen Coleman
(74) *Attorney, Agent, or Firm* — Treyz Law Group, P.C.; Michael H. Lyons (57) ABSTRACT

An imaging system may include an array of image pixels arranged in rows and columns that includes first and second pixels in two different columns and a common row. A first column readout circuit may control the first pixel to exhibit a first gain and a second column readout circuit may control the second pixel to exhibit a second gain. The first and second readout circuits may determine whether to adjust the gain of the first and second pixels based on image signals that are captured by the first and second pixels. For example, the first readout circuit may selectively activate a dual conversion gain transistor in the first pixel based on an image signal received from the first pixel and the second readout circuit may independently and selectively activate a dual conversion gain transistor in the second pixel based on an image signal received from the second pixel.

18 Claims, 6 Drawing Sheets

IMAGING SYSTEMS AND METHODS FOR PERFORMING COLUMN-BASED IMAGE SENSOR PIXEL GAIN ADJUSTMENTS

This application claims the benefit of provisional patent application No. 61/869,433, filed Aug. 23, 2013, which is hereby incorporated by reference herein in its entirety.

BACKGROUND

This relates generally to imaging devices, and more particularly, to imaging devices having pixel arrays with per-pixel gain adjustment capabilities.

Image sensors are commonly used in electronic devices such as cellular telephones, cameras, and computers to capture images. In a typical arrangement, an electronic device is provided with an array of image pixels arranged in pixel rows and pixel columns. Row control circuitry is coupled to each pixel row over row control lines for providing pixel control signals to each image pixel in the pixel row. Image pixels are often operated in a low gain mode for capturing images of brighter scenery and in a high gain mode for capturing images of darker scenery.

In conventional imaging systems, row control circuitry provides control signals to each pixel in a selected pixel row that instruct every pixel in that row to operate in either the high gain mode or the low gain mode. However, scenes to be imaged often include both brighter and darker portions across any given row of image pixels. Performing image capture operations using conventional image sensors that control image pixels in an entire pixel row to operate in the high gain or low gain mode may thereby cause some image pixels in a given pixel row to generate excessively noisy or over-saturated image signals, which can generate unsightly image artifacts in the final captured image.

It would therefore be desirable to be able to provide imaging devices with improved means of capturing and processing image signals.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
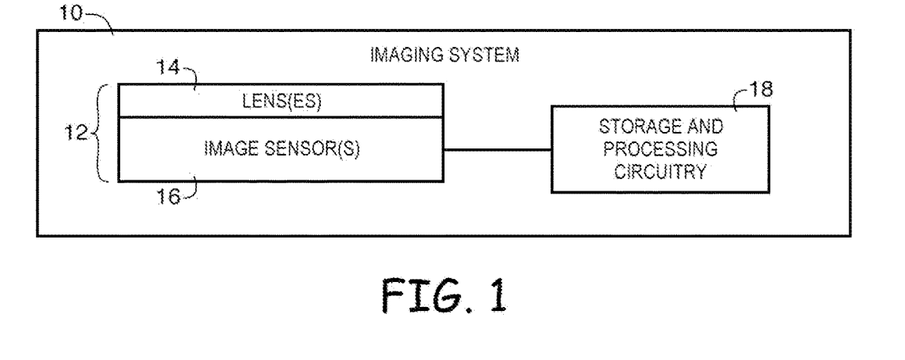
FIG. 1 is a diagram of an illustrative imaging system having an image sensor and processing circuitry for capturing images using column-based pixel gain adjustments in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
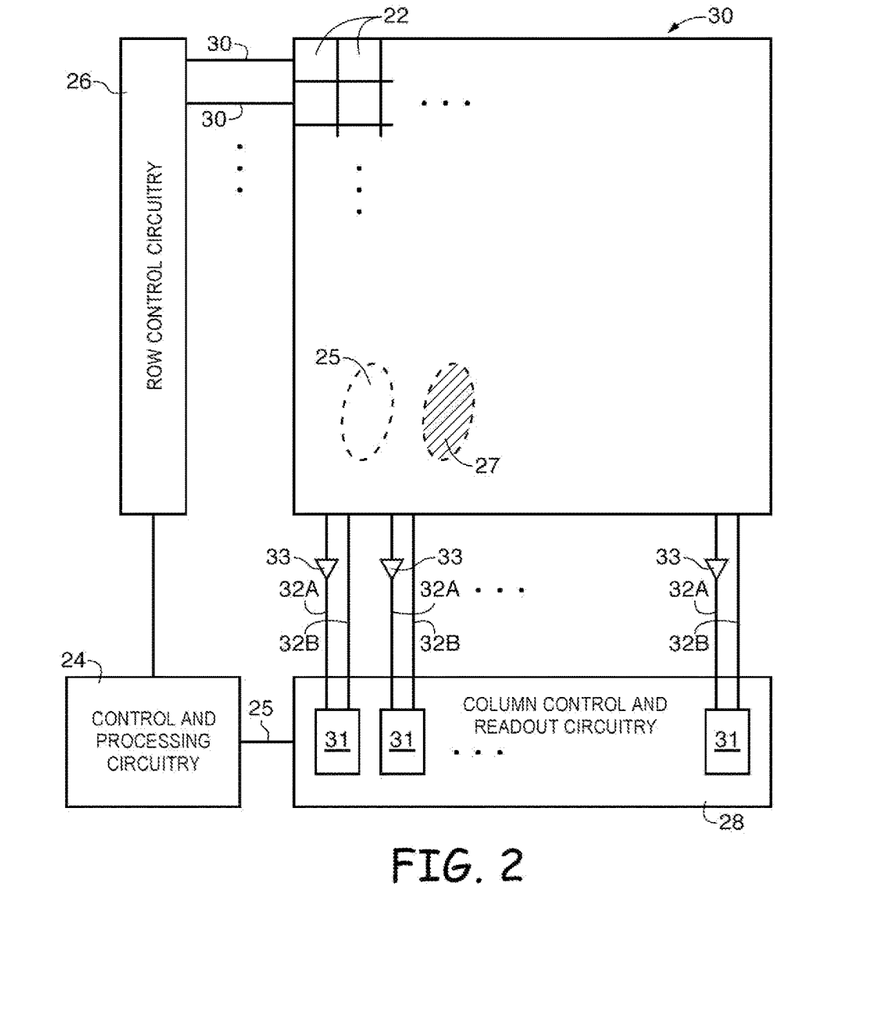
FIG. 2 is a diagram of an illustrative pixel array and associated per-column control and readout circuits for controlling gain adjustments in pixels of corresponding pixel columns in accordance with an embodiment of the present invention.

As shown in FIG. 2, image sensor 16 may include a pixel array 20 containing image sensor pixels 22 arranged in rows and columns (sometimes referred to herein as image pixels or pixels arranged in pixel rows and pixel columns) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, column decoder circuitry, or column control and readout circuitry). Row control circuitry 26 may receive row addresses from control circuitry 24 and supply corresponding row control signals such as reset, row select, charge transfer, and readout control signals to pixels 22 over row control paths 30. One or more conductive lines such as column lines 32 (e.g., column lines 32A and 32B) may be coupled to each column of pixels 22 in array 20. Column lines 32A may be used for reading out image signals from pixels 22, for supplying bias signals (e.g., bias currents or bias voltages), whereas column lines 32B may be used for supplying column-based pixel control signals to pixels 22. If desired, during pixel readout operations, a pixel row in array 20 may be selected using row control circuitry 26 and image signals generated by image pixels 22 in that pixel row can be read out along column lines 32A. Column lines 32A and 32B may sometimes be referred to herein collectively as conductive column lines (or column paths) each coupled to a corresponding column of array 20 (e.g., control signals may be provided to a first column of array 20 via a first column path, signals may be read out from the first column along the first column path, and that column path may include any desired number of conductive lines such as conductive lines 32A and 32B, etc.).

Amplifier circuitry 33 may be interposed on column lines 32A (e.g., each column line 32A may have a corresponding amplifier circuit). Amplifier circuitry 33 may amplify image signals received from an associated column of pixel array 20 and may provide the amplified image signals to column control and readout circuitry 28. Amplifier circuitry 33 may provide received image signals with a desired gain (e.g., an adjustable gain). For example, amplifier circuitry may provide image signals received from pixels 22 with a relatively high gain (e.g., when the corresponding pixel captures darker portions of a scene) or may provide image signals with a relatively low gain (e.g., when the corresponding pixel captures brighter portions of a scene). Column control and readout circuitry 28 may provide control signals to amplifier circuitry 33 and to gain circuitry in pixel 22 (e.g., over column lines 32B or other desired control paths) to control the gain provided by pixel 22 and amplifier circuitry 33 to the received image signals.

Image readout circuitry 28 may receive image signals (e.g., analog pixel values generated by pixels 22) over column lines 32A. Image readout circuitry 28 may include sample-and-hold circuitry for sampling and temporarily storing image signals read out from array 20, amplifier circuitry, analog-to-digital conversion (ADC) circuitry, bias circuitry, comparator circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Image pixels 22 may be operated in a low gain mode for capturing images of brighter scenery and in a high gain mode for capturing images of darker scenery. During image capture operations, portions of array 20 may capture image signals from darker portions of an imaged scene whereas other portions of array 20 may capture image signals from brighter portions of the imaged scene. In the example of FIG. 2, pixels 22 in portions 25 of array 20 may capture brighter portions of the imaged scene whereas pixels 22 in portions 27 may capture darker portions of the imaged scene. If desired, different pixels 22 in a given pixel row may be provided with respective control signals via corresponding control lines 32B that instruct the pixels to operate with a desired gain (e.g., in either a high or low gain mode). For example, pixels 22 located in brighter region 25 of a given row of array 20 may be provided with control signals via control lines 32B that instruct those pixels to operate in a low gain mode (e.g., to prevent over-saturation of the image pixels), whereas pixels 22 located in darker region 25 of the given row of array 20 may be provided with control signals via control lines 32B that instruct those pixels to operate in a high gain mode (e.g., to improve signal-to-noise ratio in the image signals captured by those pixels).

If desired, column readout and control circuitry 28 may include per-column control circuits 31 that are each coupled to a respective column path 32 (e.g., to a corresponding pair of conductive column lines 32A and 32B). Column control circuits 31 may include readout circuitry (e.g., sample and hold circuitry, converter circuitry, etc.) for reading out signals from the corresponding column of pixels 22 and may include control circuitry for providing control circuitry to the corresponding column of pixels 22 (e.g., a given column control circuit 31 may only readout and provide control signals to pixels in a corresponding column without reading out or controlling pixels in other columns of array 20). Control circuits 31 may provide respective control signals to the corresponding column of pixels 22 that instruct the pixels in that column to operate with a desired gain. For example, a first control circuit 31 coupled to a first column line 32B may instruct pixels 22 in a first column of a selected row of array 20 to capture signals in a low gain mode whereas a second control circuit 31 coupled to a second column line 32B may instruct pixels 22 in a second column of the selected row of array 20 to capture signals in a high gain mode. Control circuits 31 may control the gain of a given column of pixels 22 by, for example, adjusting the gain provided by the amplifier circuit 33 in that column and/or by adjusting gain control signals provided to the pixels 22 over lines 32B. Gain control signals provided to pixels 22 over lines 32B may include, for example, dual conversion gain (DCG) control signals that are configured to adjust the charge storage capacity of a given pixel 22.

Per-column control circuits 31 may each include image signal processing circuitry that processes signals that are read out from the corresponding column of pixels 22. Processing circuitry in column control circuits 31 may include analog comparator circuitry, digital comparison logic circuitry, or other processing circuitry for processing image signals. Image processing circuitry in per-column control circuits 31 may process signals read out from pixels 22 to determine whether the gain used by pixels 22 in the corresponding column needs to be adjusted. If circuit 31 determines that the gain needs to be adjusted, circuit 31 may provide control signals to pixels 22 in the corresponding column that adjust the gain used by the pixel to capture image signals. In this way, gain selection and adjustments used by pixels 22 for capturing image signals may be actively adjusted for each pixel 22 across a given row of pixel array 20, allowing for a single row to capture signals using both low gain and high gain modes (e.g., based on whether certain pixels in that row are located in bright portions 25 or dark portions 27 of the imaged scene).

Figure 3:
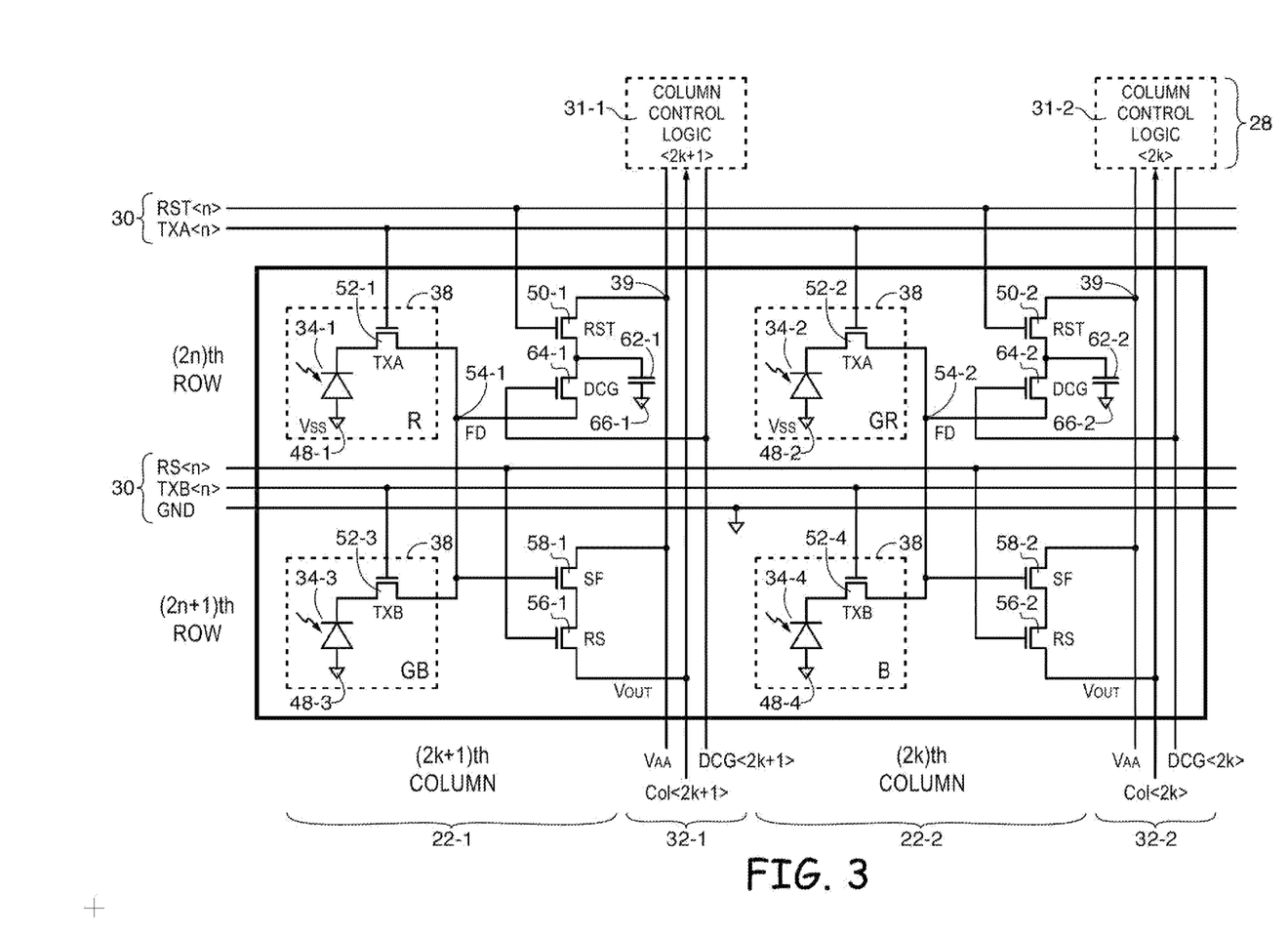
FIG. 3 is a circuit diagram of illustrative image sensor pixels in two columns and two rows of a pixel array that are coupled to respective column control and readout circuits for independently capturing and outputting image signals using selected pixel gains in accordance with an embodiment of the present invention.

FIG. 3 is a circuit diagram of illustrative image sensor pixels 22 that are coupled to per-column control circuits 31 for performing per-column gain adjustment operations. As shown in FIG. 3, pixel array 20 may include a first image pixel 22-1 and a second image pixel 22-2. First pixel 22-1 may be coupled to a first column control circuit 31-1 in readout circuitry 28 via first column path 32-1 (including corresponding column conductive lines 32A and 32B) whereas second pixel 22-2 may be coupled to a second column control circuit 31-2 in readout circuitry 28 via second column lines 32-2. Amplifiers 33 are not shown in the example of FIG. 3 for the sake of clarity. Pixels 22-1 and 22-2 may include any desired number of photosensitive regions for capturing image charge. In the example of FIG. 3, pixels 22-1 and 22-2 each include two photosensitive regions (photodiodes) 34 coupled to a shared charge storage node 54 (e.g., photodiodes 34 may pass captured charge to the corresponding photodiode 54 via respective charge transfer gates 52). Each photodiode may be provided with a corresponding color filter element 38 for capturing light of a desired color. In the example of FIG. 3, red, green, and blue color filter elements 38 are formed over photodiodes 34 but, in general, any desired color filter elements may be used (e.g., clear color filter elements, yellow color filter elements, infrared color filter elements, etc.). Pixels 22-1 and 22-2 may, for example, be formed in a common row of pixel array 20. Pixels 22-1 and 22-2 may receive row control signals (e.g., reset control signals RST, charge transfer control signals TXA and TXB, and row select control signals RS) from row control circuitry 26 via row control lines 30.

A positive power supply voltage (e.g., voltage Vaa or another reset-level voltage) may be supplied at positive power supply terminals 39 (e.g., from column control circuits 31 or other power supply circuitry). A ground power supply voltage (e.g., Vss) may be supplied at ground terminals 48. Incoming light may be collected by photodiodes 34 after passing through corresponding color filter elements 38. Photodiodes 34 convert the incoming light that passes through the corresponding color filter element into electrical charge.

If desired, row control circuitry 26 (as shown in FIG. 2) may assert reset control signal RST before an image is acquired. This turns on reset transistors 50 (e.g., a first reset transistor 50-1 in pixel 22-1 and a second reset transistor 50-2 in pixel 22-2) and resets charge storage nodes 54 (a first charge storage node 54-1 in pixel 22-1 and a second charge storage node 54-2 in pixel 22-2) to Vaa or another reset-level voltage. Charge storage nodes 54 may sometimes be referred to herein as floating diffusion nodes FD or floating diffusion regions FD. Each charge storage node 54 may be shared by the photosensitive regions 34 in the corresponding pixel and may store charge generated by each photosensitive region 34 in that pixel 22. In the example of FIG. 3, charge storage node 54-1 may store charge generated by photodiodes 34-1 and 34-3 whereas charge storage node 54-2 may store charge generated by photodiodes 34-2 and 34-4. Charge storage nodes 54 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiodes 34 (e.g., regions 54 may have a corresponding charge capacity indicative of the amount of charge that can be stored at region 54). The signal associated with the stored charge on node 54 is conveyed to row select transistors 56 by source-follower transistors 58.

Each photodiode 34 in pixels 22 may be coupled to charge storage regions 54 through a corresponding charge transfer gate 52 (e.g., a first charge transfer gate 52-1 may be coupled between photodiode 34-1 and node 54-1 in pixel 22-1, a second charge transfer gate 52-2 may be coupled between photodiode 34-2 and node 54-2 in pixel 22-2, a third charge transfer gate 52-3 may be coupled between photodiode 34-3 and node 54-3 in pixel 22-1, etc.). Row control circuitry 26 may provide corresponding charge transfer control signals TX to the gate terminal of each charge transfer gate 52.

The reset control signal RST may be deasserted to turn off reset transistor 50 across the row of array 20. After the reset process is complete, transfer gate control signals TX may be asserted to turn on corresponding transfer gates 52. When transfer transistors 52 are turned on, the charge that has been generated by the corresponding photodiode 34 in response to incoming light is transferred to charge storage node 54. When it is desired to read out the value of the stored charge (i.e., the value of the stored charge that is represented by the signal at the source S of transistor 58), row select control signal RS may be asserted (e.g., concurrently for all pixels in the selected row). When signal RS is asserted, transistors 56 turns on and a corresponding image signal $V_{OUT}$ that is representative of the magnitude of the charge on the corresponding charge storage node 54 (e.g., a reset-level or an image-level voltage from one or more photodiodes 34) is produced on output path 32. In a typical configuration, there are numerous rows and columns of image pixels such as image pixel 22 in image pixel array 20. When row select control signal RS is asserted in a given row, a path such as column line 32 may be used to route signal $V_{OUT}$ from that image pixel to per-column control and readout circuit 31 associated with that column of array 20. If desired, reset-levels and image-levels may be sampled, held, and converted for each image pixel 22 to allow for kTC reset noise compensation via a correlated double sampling technique, for example.

Pixels 22 may be provided with gain selection circuitry that enhances the dynamic range of the images produced by image sensor 16. For example, each pixel 22 may generate a corresponding image signal using a selected gain setting (mode). In some configurations, a selected gain setting may depend on the amount of light captured by the pixel during an exposure (i.e., an integration period between resets of the pixel during which a photosensitive element generates charges in response to incoming light). In other configurations, the gain may be kept at a constant setting. As shown in FIG. 3, image pixels 22-1 and 22-2 may include capacitors 62 and transistors 64 coupled in series between terminals 66 and floating diffusion nodes 54 (e.g., pixel 22-1 may include a first capacitor 62-1 and transistor 64-1 coupled in series between terminal 66-1 and floating diffusion node 54-1 whereas pixel 22-2 may include a second capacitor 62-2 and transistor 64-2 coupled in series between terminal 66-2 and floating diffusion node 54-2). In one suitable arrangement, terminals 66 may be coupled to positive power supply voltage Vaa. In another suitable arrangement, terminals 66 may be coupled to ground power supply Vss.

Transistors 64 may have gate terminals that are controlled using dual conversion gain control signal DCG. Pixels 22-1 and 22-2 may receive dual conversion gain control signals DCG over the corresponding column line 32B from circuits 31 (e.g., pixel 22-1 may receive dual conversion gain signal DCG over column lines 32-1 from column circuit 31-1 whereas pixel 22-2 may receive dual conversion gain signal DCG over column lines 32-2 from column circuit 31-2). Pixel 22 may be operable in a high conversion gain mode (high gain mode) and in a low conversion gain mode (low gain mode). If transistor 64 is disabled (e.g., if signal DCG is low), the corresponding pixel 22 is placed in the high conversion gain mode. If transistor 64 is enabled (e.g., if signal DCG is high), the corresponding pixel 22 is placed in the low conversion gain mode.

In general, pixel conversion gain is inversely proportional to the amount of loading capacitance at node FD. When transistor 64 is turned on, capacitor 62 is switched into use in order to provide floating diffusion node 54 with additional capacitance (e.g., additional charge storage capacity). This results in a lower conversion gain for pixel 22. When transistor 64 is turned off, the additional loading of capacitor 66 is removed and pixel 22 reverts to a relatively higher pixel conversion gain configuration. Per-column control circuits 31 may independently adjust dual conversion gain control signal DCG provided to pixels 22 across a selected row while the row select signal RS is asserted for all of the pixels in that row (e.g., control signal DCG may be pulsed high or low without deasserting row select signal RS). In this way, per-column control circuits may individually adjust the conversion gain provided for each pixel 22 in a given row of array 20 during image capture and readout operations.

The example of FIG. 3 is merely illustrative. Each pixel 22 may include any desired number of photosensitive regions 34 (e.g., one photodiode 34, three photodiodes 34, four photodiodes 34, etc.) coupled to a corresponding charge storage node 54 (e.g., via corresponding charge transfer gates). Gates 50, 64, 52, and nodes 66, 54, and 48 in each pixel 22 may be coupled together in any desired manner. If desired, multiple DCG gates 64 may be coupled to each storage region 54 for coupling storage region 54 to multiple additional storage capacitances 62 (e.g., to allow for more finely tuned adjustment of the storage capacity in the pixel). In general, each pixel 22 may include any desired number of photosensitive regions coupled to a charge storage region by corresponding charge transfer gates and may include one or more additional capacitances coupled to the charge storage region by one or more corresponding DCG gates that are controlled by a corresponding per-column control circuit 31.

If desired, column control logic circuits 31 may read out image signals from pixels 22 and may process the pixels to determine whether the pixel conversion gain needs to be adjusted in that column (e.g., for that pixel). For example, each per-column control circuit 31 may process image signals of a corresponding pixel in a selected pixel row (e.g., a pixel row to which row select signal RS is asserted) to determine whether that pixel needs to adjust conversion gain regardless of the conversion gain used by the other pixels in the selected pixel row.

Figure 4:
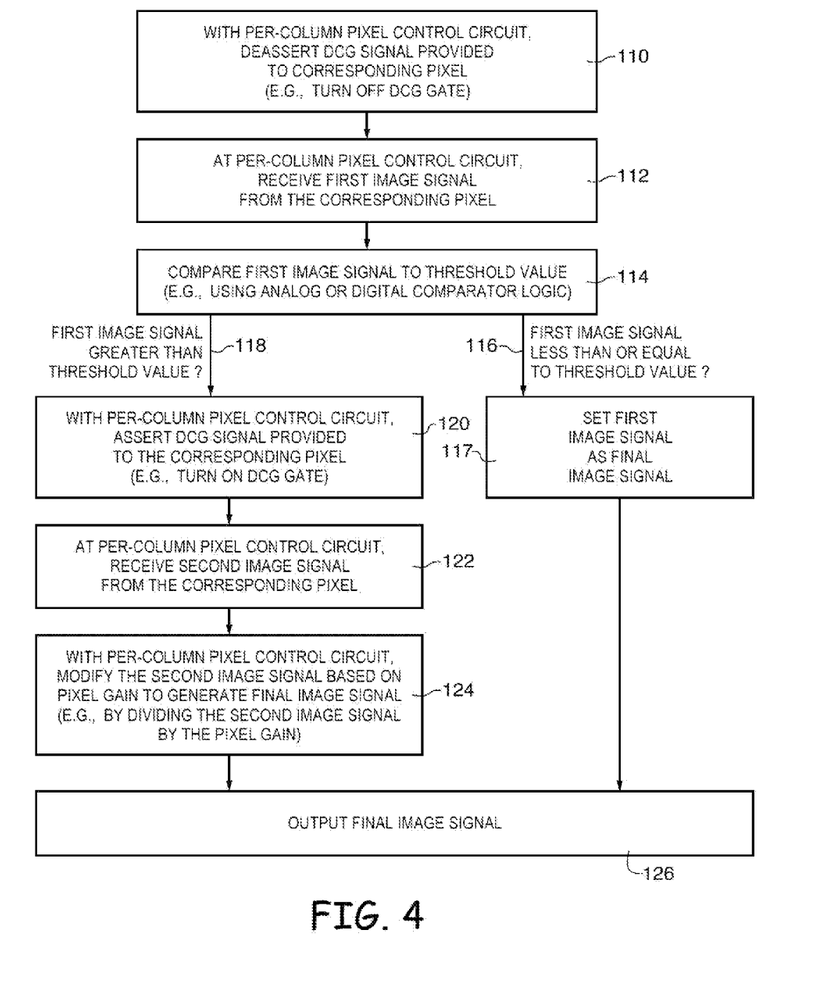
FIG. 4 is a flow chart of illustrative steps that may be performed by a per-column control and readout circuit for adjusting the conversion gain of a corresponding pixel in response to image signals captured by that pixel in accordance with an embodiment of the present invention.

FIG. 4 is a flow chart of illustrative steps that may be performed by a given per-column control circuit 31 for processing image signals captured by a given pixel 22 and for adjusting gain in that pixel 22. The steps of FIG. 4 may, for example, be performed by a per-column control circuit 31 coupled to a given pixel 22 via a corresponding column lines 32A and 32B when the pixel row in which the given pixel 22 is located is selected by row control circuitry 26.

The steps of FIG. 4 may be performed independently for each pixel 22 (using a corresponding pixel control circuit 31) in parallel (e.g., simultaneously or concurrently) to provide active and independent gain control to each pixel in the selected row while the row is selected.

At step 110, per-column control circuit 31 may deassert dual conversion gain signal DCG provided to the gate terminal of DCG transistor 64 of the corresponding pixel 22 (e.g., control circuit 31 may turn off DCG gate 64). In this way, additional capacitance 62 may be removed from charge storage region 54 of pixel 22 so that pixel 22 may capture a first image signal in a high conversion gain mode (high gain mode). The first image signal may, if desired, include a reset-level signal and an image-level signal for performing a correlated double sampling (CDS) readout operation.

At step 112, per-column control circuit 31 may receive the first image signal captured by pixel 22 in the high conversion gain mode (e.g., while control signal DCG is deasserted). Column control circuit 31 may sample and hold the reset-level and image-level signals on associated sample and hold circuitry.

At step 114, column control circuit 31 may compare the first image signal received from pixel 22 to a selected threshold value to determine whether additional charge storage is required at pixel 22 (e.g., to determine whether to adjust the gain or switch gain modes at pixel 22). For example, column control circuit 31 may include analog comparator circuitry that compares the analog first image signal to the selected (predetermined) threshold value. In another suitable arrangement, column control circuit 31 may include analog-to-digital converter circuitry that converts the first image signal into a first digital pixel value and digital comparison logic that compares the first digital pixel value to the selected threshold value.

The selected threshold value may be any desired threshold for determining whether the gain of pixel 22 needs to be adjusted. As one example, the selected threshold value may be a saturation level (or based on a saturation level) associated with pixel 22. For example, the threshold value may be set to the 100% of the saturation level of storage region 54, to 90% of the saturation level of storage region 54, to 80% of the saturation level of storage region 54, or to any other desired value (a value less than or equal to 100% of the saturation level, less than or equal to 90% of the saturation level, less than or equal to 80% of the saturation level, etc.). In this scenario, the threshold value is selected such that the first image signal is compared to a voltage level at which the charge storage capacity of storage region 54 in pixel 22 is sufficiently full (e.g., sufficiently saturated with charge). When pixel 22 is saturated, it may be desirable to extend the storage capacity associated with pixel 22 (e.g., adjust the gain of pixel 22) so that pixel 22 may continue to capture and store charge (e.g., without saturating or blooming). The selected threshold value may be determined during manufacturing and characterization of imaging system 10 and may be stored on imaging system 10 for use during normal imaging operations.

If the comparator circuitry in column circuit 31 determines that the first image signal is less than or equal to the selected threshold value (e.g., that the charge storage region on pixel 22 is not saturated or is sufficiently below saturation such as when pixel 22 is located within darker portions 27 of the imaged scene), processing may proceed to step 117 as shown by path 116. At step 117, column circuit 31 may set the first signal as a final image signal and processing may proceed to step 126 to output the final image signal to other circuitry for performing additional processing (e.g., other image processing circuitry, display circuitry, etc.). In this scenario, there may be no need to adjust the gain of pixel 22, as storage node 54 does not saturate with charge.

If the comparator circuitry in column circuit 31 determines that the first image signal is greater than the selected threshold value (e.g., determines that the first image signal saturates charge storage node 54 on pixel 22 or is sufficiently close to saturation such as when pixel 22 is located within brighter portions 25 of the imaged scene), processing may proceed to step 120 as shown by path 118.

At step 120, column circuit 31 may assert dual conversion gain signal DCG to the gate terminal of DCG transistor 64. Transistor 64 may be turned on and may extend the storage capacity of storage node 54 to include the capacitance of capacitor 62 so that pixel 22 may capture a second image signal with the low conversion gain (e.g., in the low conversion gain mode). If desired, the second image signal may include a reset-level signal and an image-level signal for performing a CDS readout operation.

At step 122, column circuit 31 may receive the second image signal captured by pixel 22 in the low conversion gain mode (e.g., while control signal DCG is asserted). Column control circuit 31 may sample and hold the reset-level and image-level signals on sample and hold circuitry.

At step 124, column circuit 31 may process the received second signal to generate a final image signal. If desired, column circuit 31 may modify (adjust) the second signal based on the pixel gain of pixel 22. For example, column circuit 31 may generate the final image signal by dividing the second image signal by the pixel gain. The pixel gain of pixel 22 may be defined herein as the ratio of the conversion gain of pixel 22 when DCG gate 64 is turned off to the conversion gain of pixel 22 when DCG gate 64 is turned on (the pixel gain may, for example, be determined during calibration and characterization of image sensor 16 during manufacture, testing, or assembly of imaging system 10 of FIG. 1). As an example, when the conversion gain of pixel 22 with DCG gate 64 turned off is 150 uV/e– and the conversion gain of pixel 22 with DCG gate 64 turned on is 50 uV/e– (e.g., as determined during characterization of image sensor 16 prior to normal operation of imaging system 10), the pixel gain of pixel 22 may be equal to 150/50=3.0. Column circuit 31 may thereby generate the final image signal by dividing the second image signal by 3.0.

At step 126, column circuit 31 may output the final image signal to other circuitry for performing additional processing (e.g., other image processing circuitry within readout circuitry 28, within processing circuitry 18, display circuitry, etc.). In this way, column readout circuit 31 may analyze the image signals captured by a corresponding pixel 22 in real time to determine whether the pixel is located in a bright portion of the scene (e.g., when the first image signal is greater than the threshold value) or in a dark portion of the scene (e.g., when the first image signal is less than the threshold value) so that the gain may be adjusted to suit the brightness of the portion of the scene in which the pixel is located (e.g., so that only a high conversion gain mode may be used when the pixel 22 is in a darker portion of the image and both the high and low conversion gain modes may be used when pixel 22 is in a brighter portion of the image, thereby allowing for sufficient signal-to-noise ratio without saturation or blooming in the final image signal). By repeating the steps of FIG. 4 for each column circuit 31 to readout and adjust gain independently for each pixel 22 in a corresponding row of array 20, final image signals may be readout with an intelligently selected gain setting based on whether a given pixel is located in a dark or bright portion of the image across the corresponding pixel row (e.g., thereby allowing for sufficient signal-to-noise ratio in the final image signal generated across the corresponding pixel row without generating saturation or blooming regardless of whether different portions of the corresponding pixel row are illuminated by darker or brighter portions of the imaged scene).

If desired, gain control provided by per-column control circuit 31 may be finely tuned by adjusting the gain provided by column amplifiers 33 (as shown in FIG. 2) in addition to adjusting the conversion gain in pixels 22. For example, in addition to adjusting gain by turning DCG gates 64 on or off, a first column circuit such as circuit 31-1 of FIG. 3 may adjust a first amplifier 33 on column line 32-1 to have a first gain value whereas a second column circuit such as circuit 31-2 may adjust a second amplifier 33 on column line 32-2 to have a second gain value based on whether the corresponding pixels 22 are in brighter or darker portions of the scene (e.g., based on the image signals captured by the corresponding pixels 22).

Figure 5:
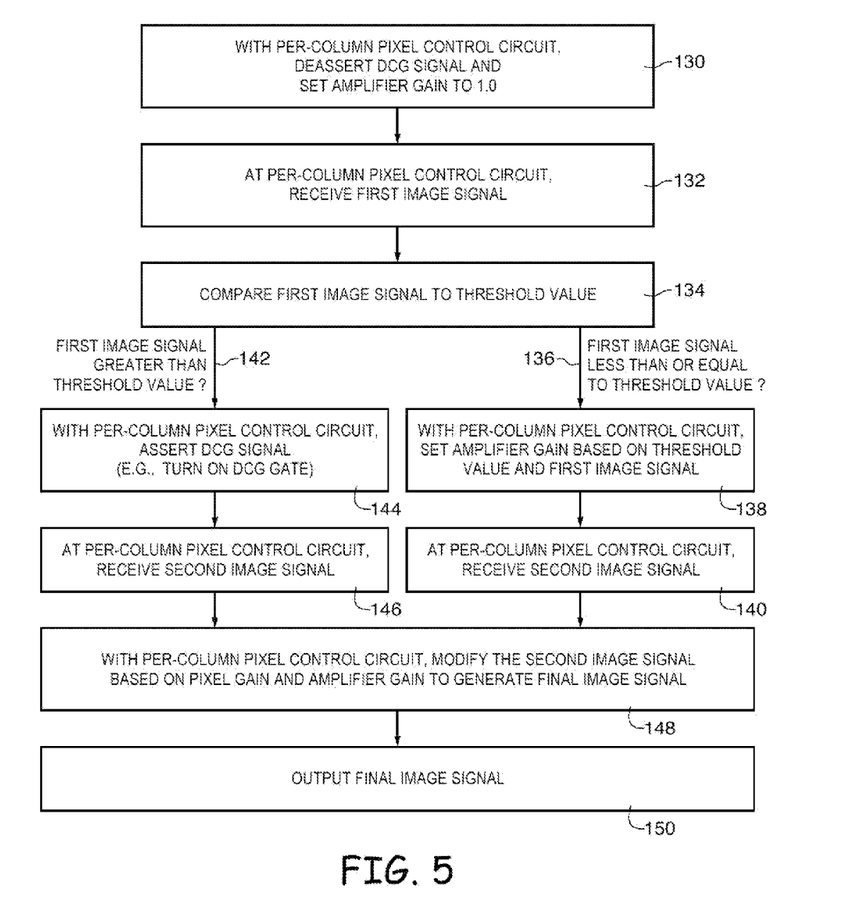
FIG. 5 is a flow chart of illustrative steps that may be performed by a per-column control and readout circuit for adjusting the conversion gain of a corresponding pixel and adjusting the gain of a column readout amplifier coupled to the pixel in response to image signals captured by that pixel in accordance with an embodiment of the present invention.

FIG. 5 is a flow chart of illustrative steps that may be performed by a given per-column control circuit 31 for adjusting the gain provided by an associated pixel 22 by adjusting dual conversion gain control signal DCG and/or by adjusting the gain of a corresponding column amplifier 33. The steps of FIG. 5 may, for example, be performed by a per-column control circuit 31 coupled to a given pixel 22 via corresponding column lines 32A and 32B when the pixel row in which the given pixel 22 is located is selected by row control circuitry 26. The steps of FIG. 5 may be performed independently for each pixel 22 (using a corresponding pixel control circuit 31) in parallel (e.g., simultaneously or concurrently) to provide active and independent gain control to each pixel in the selected row.

At step 130, per-column pixel control circuit 31 may deassert control signal DCG to the corresponding pixel 22 to turn off DCG gate 64. Control circuit 31 provide control signals to the corresponding column amplifier 33 to set the gain of column amplifier 33 to 1.0 (e.g., so that the power level of image signals received by amplifier 33 is the same as the power level of image signals output by amplifier 33).

At step 132, column control circuit 31 may receive the first image signal captured by pixel 22 through amplifier 33. For example, column circuit 31 may receive a first reset-level and image-level signal from amplifier 33.

At step 134, column circuit 31 may compare the first image signal to a selected threshold value to determine whether the first image signal is greater than or less than the selected threshold value (e.g., to determine whether pixel 22 is saturating or sufficiently close to saturating storage node 54). If the first image signal is less than or equal to the selected threshold value, processing may proceed to step 138 as shown by path 136.

At step 138, column circuit 31 may adjust the gain of amplifier 33 based on the threshold value (e.g., the maximum pixel value immediately before storage node 54 saturates) and/or the first image signal (e.g., the magnitude of the first image signal). For example, column circuit 31 may provide control signals to amplifier 33 that set the gain of amplifier 33 to the ratio of the selected threshold value to the magnitude of the first image signal. In this way, the gain of amplifier 33 may be increased to ensure that the charge capacity of charge storage region 54 is fully utilized without saturating (e.g., to ensure that the final image signals have a maximum signal-to-noise ratio). Image pixel 22 may capture a second image signal and may provide the second image signal to amplifier 33. Amplifier 33 may amplify the second image signal based on the selected amplifier gain.

At step 140, column circuit 31 may receive the amplified second image signal from an output of amplifier 33. The amplified second image signal may include a second reset-level signal and an image-level signal. Processing may subsequently proceed to step 148.

At step 148, column circuit 31 may modify the second image signal based on the pixel gain of pixel 22 and the amplifier gain of amplifier 33 (e.g., the amplifier gain as set while processing step 138) to generate a final image signal. For example, circuit 31 may generate the final image signal by dividing the second image signal by the pixel gain and the selected amplifier gain. Processing may subsequently proceed to step 150 to output the final image signals to external processing circuitry.

If the first image signal is greater than the selected threshold value (e.g., if storage node 54 is saturated or sufficiently close to saturation), processing may proceed to step 144 as shown by path 142. At step 144, column circuit 31 may assert dual conversion gain signal DCG to the gate terminal of DCG transistor 64 to turn on transistor 64 (e.g., to extend the storage capacity of storage node 54 to include the capacitance of capacitor 62 so that pixel 22 may capture a second image signal with the low conversion gain).

At step 146, column circuit 31 may receive the second image signal from the output of amplifier 33. The second image signal received from the output of amplifier 33 may have the same power level as the second image signal when received at the input of amplifier 33 (e.g., because the gain of amplifier 33 is set to 1.0 while processing step 130). If desired, the second image signal may include a reset-level signal and an image-level signal for performing a CDS readout operation.

At step 148, column circuit 31 may modify the second image signal based on the pixel gain of pixel 22 and the amplifier gain of amplifier 33 (e.g., as set while processing step 138) to generate a final image signal. For example, circuit 31 may generate the final image signal by dividing the second image signal by the pixel gain and the selected amplifier gain (e.g., 1.0). Processing may subsequently proceed to step 150 to output the final image signals to external processing circuitry.

By controlling both the gain of amplifier 33 and the conversion gain of pixel 22, column circuit 31 may more finely tune the gain of pixel 22 relative to scenarios when only the conversion gain of pixel 22 is adjusted. The steps of FIG. 5 may be performed for each column circuit 31 to readout and adjust the gain independently for each pixel 22 in a selected row of array 20 and final image signals may be readout with an intelligently selected gain setting based on whether a given pixel is located in a dark or bright portion of the image across the corresponding pixel row (e.g., thereby allowing for sufficient signal-to-noise ratio in the final image signal generated across the corresponding pixel row without generating saturation or blooming regardless of whether different portions of the corresponding pixel row are illuminated by darker or brighter portions of the imaged scene).

The example of FIGS. 4 and 5 is merely illustrative. If desired, column circuit 31 may compare the first image signal to any desired number of threshold values. For example, column circuit 31 may compare the first image signal to multiple threshold values each corresponding to an associated dual conversion gain gate 64 in pixel 22 (e.g., in scenarios where multiple dual conversion gain gates 64 are coupled between charge storage region 54 and respective capacitances 62) and may selectively turn on one or more of the DCG gates 64 to adjust the storage capacity (and conversion gain) of pixel 22 based on the image signals that are captured by pixel 22.

By allowing active, per-pixel adjustment of gain provided for pixels 20 in a given row of array 20, column circuits 31 may improve the intra-scene dynamic range of the final image (e.g., so that brighter portions of the image are not over-saturated while darker portions of the same image have sufficient signal-to-noise ratio). If desired, imaging system 10 may be operated in a linear mode or in a high-dynamic-range mode (HDR mode) in which long and short exposure pixel values are captured and combined to provide an image with improved dynamic range. The dynamic range of an image may be defined herein as the ratio of the brightest portion of an image to the darkest portion of an image. As an example, the intra-scene dynamic range (e.g., the dynamic range within a given image) of the captured image may be improved from 64 dB to 78 dB in a linear imaging mode and from 88 dB to 100 dB in an HDR imaging mode when performing per-pixel gain adjustments as described in connection with FIGS. 1-5 relative to scenarios where a single common gain adjustment is performed for all pixels across a row of pixels.

Figure 6:
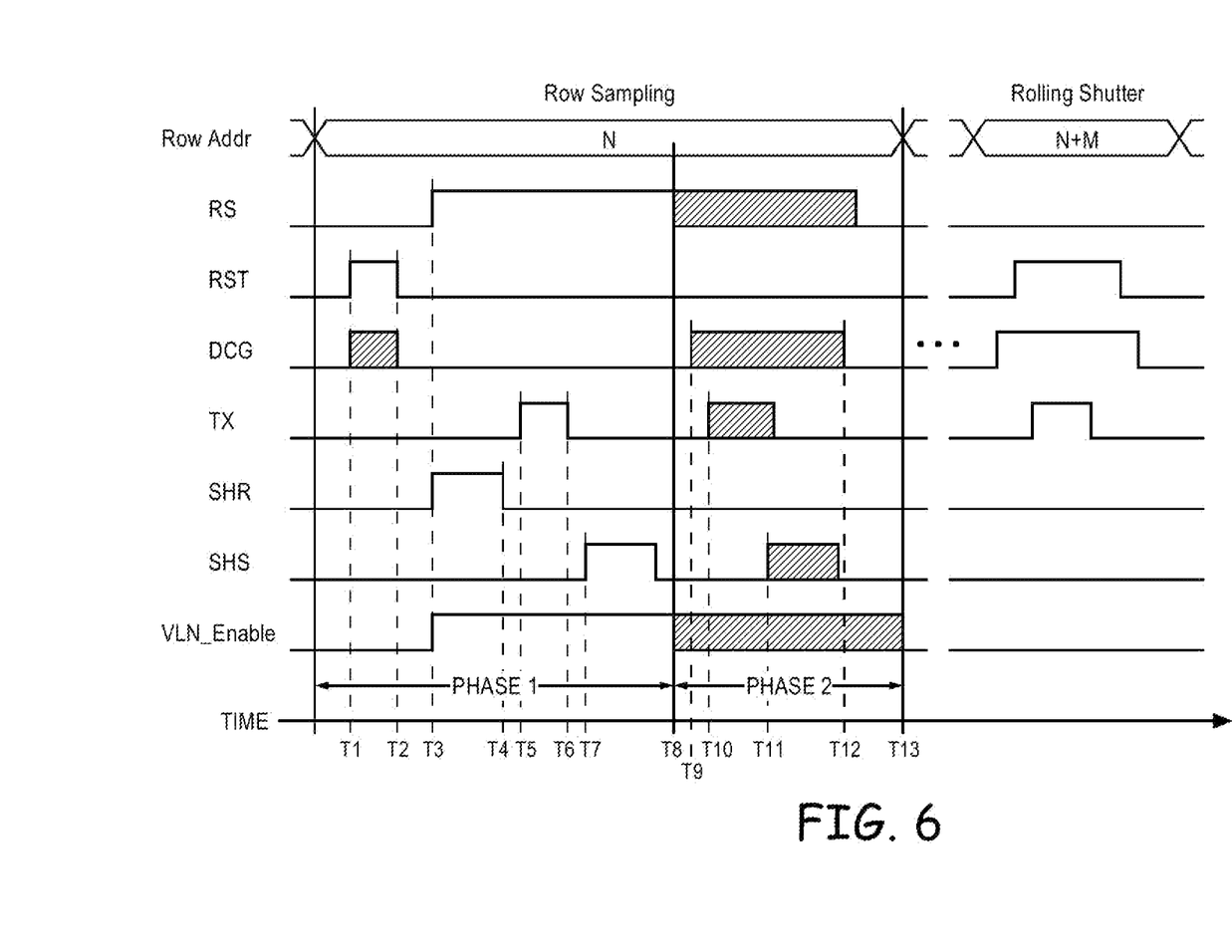
FIG. 6 is an illustrative timing diagram showing how a per-column control and readout circuit may turn on a dual conversion gain gate in a corresponding pixel while row control circuitry continuously asserts a row select signal to a row select gate in the pixel for adjusting the conversion gain of the pixel in response to image signals captured by that pixel in accordance with an embodiment of the present invention.

FIG. 6 is an illustrative timing diagram showing how row and column control signals may be provided to array 20 when performing per-pixel gain adjustments. As shown in FIG. 6, control signals such as row select control signal RS, reset control signal RST, and charge transfer signal TX may be provided to a given row of pixels from row control circuitry 28 over row control lines 30. Dual conversion gain control signal DCG may be provided to given pixel 22 in the given row by per-column control circuit 31. Sample and hold control signals SHR and SHS may be provided to control circuit 31 for performing sample and hold operations on image signals received from pixel 22. Current source control signal VLN_enable may be provided to a current source coupled to the corresponding column line 32A.

At time T1, row control circuitry 26 and control circuitry 31 may assert reset control signal RST to turn on reset gate 50 and assert control signal DCG to turn on gate 64 of pixel 22 (and each of the other pixels in the same row of array 20 as pixel 22). Reset gate 50 may be turned off by deasserting reset control signal RST and gate 64 may be turned off by deasserting control signal DCG at time T2.

At time T3, row select control signal RS may be asserted to the corresponding row of pixels in which pixel 22 is located to select that row of pixels and to enable reading out of image signals from that row (e.g., by turning on row select transistors 56). Sample and hold reset signal SHR may be asserted at time T3 to sample a reset-level signal from pixel 22 onto control circuit 31. Current source control signal VLN_enable may be asserted at time T3 to enable a current source coupled to column line 32A.

At time T4, sample and hold reset signal SHR may be deasserted. At time T5, row control circuitry 26 may assert charge transfer control signal TX to enable charge transfer gate 52 on pixel 22 to transfer charge generated by photodiode 34 on pixel 22 onto charge storage region 54. At time T6, charge transfer signal TX may be deasserted.

At time T7, sample and hold image signal SHS may be asserted to sample an image level signal from pixel 22 onto control circuit 31. The image level signal and reset level signal may be used for performing CDS readout operations on the image signals. As an example, steps 110-112 of FIG. 4 and steps 130 and 132 of FIG. 5 may be performed between times T1 and T6 of FIG. 6 (sometimes referred to herein as a phase one readout operation).

At time T8, control circuit 31 may process the read out image signal (e.g., the signals read out between times T3 and T8) to determine whether excessive charge has been stored on storage node 54 (e.g., by comparing the read out image signal to the predetermined threshold at step 134 of FIG. 5 or step 114 of FIG. 4). Other control circuits 31 in circuitry 28 may process the image signals read out from corresponding pixels in the selected row of array 28 in parallel. In the scenario of FIG. 5, if control circuit 31 determines that the read out image signal has a magnitude that is less than or equal to the threshold value, control circuit 31 may increase the gain of amplifier 33 and may assert the shaded control signals shown between times T8 and T13 of FIG. 6 without asserting control signal DCG (e.g., while processing steps 138, 140, 148, and 150 of FIG. 5) to read out second image signals. In the scenario of FIG. 4, if control circuit 31 determines that the read out image signal has a magnitude that is less than or equal to the threshold (e.g., that there is not excessive charge stored on storage node 54), control circuit 31 may omit the shaded control signals shown between times T8 and T13 of FIG. 6 and the read out image signals may be used as final image signals that are output to additional processing circuitry. The time period between times T8 and T13 as shown in FIG. 6 may sometimes be referred to herein as a phase two readout operation.

If control circuit 31 determines that the read out image signal is greater than the threshold value (e.g., that there is excessive charge stored on storage node 54), control circuit 31 may adjust the conversion gain of pixel 22 (e.g., by performing step 144 of FIG. 5 or step 120 of FIG. 4) without deasserting row control signal RS using row control circuitry 26. For example, at time T9, control circuit 31 may assert dual gain conversion control signal DCG to turn on DCG gate 64 in pixel 22 while row select gate 56 in pixel 22 remains turned on (e.g., without turning off the row select gate 56 of that pixel). In other words, DCG gates 64 may be independently turned on for some or all of the pixels in the selected row without selecting a different row of array 20 for capturing image signals (e.g., image signals in a given pixel of a selected row may capture image signals with its DCG gate 64 turned on and with its DCG gate 64 turned off while the selected row is enabled while another pixel in the selected row only captures image signals with its DCG gate 64 turned off).

At time T10, transfer control signal TX may be asserted to transfer additional charge generated by photodiode 34 onto storage node 54 (and capacitor 62). At time T11, control signal TX may be deasserted and sample and hold image control signal SHS may be asserted to readout the transferred charge as the second image signal from pixel 22.

At time T12, control signals SHS, RS, and DCG may be deasserted. After time T13, control circuits 31 may perform a readout process such as a rolling shutter or a global shutter readout process to readout the final image signals. Current source control signal VLN_enable may be disabled at time T13. The example of FIG. 6 is merely illustrative. If desired, the control signals may be asserted and deasserted in any desired order.

In this way, dual conversion gain gate 64 in a given pixel 22 may be selectively turned on only if column control circuit 31 determines that that pixel 22 requires additional storage capacity (e.g., based on the image signals captured by that pixel between times T1 and T8) prior to performing image capture and readout operations on subsequent rows in the array. Dual conversion gain gate 64 may only be turned on in pixels 22 of a given row if those pixels are capturing excessive charge (e.g., due to those pixels being located in brighter portions of the imaged scene for which the captured first signals exceed the threshold level), while pixels 22 of the given row that do not capture excessive charge (e.g., pixels in darker portions of the imaged scene for which the captured first signals did not exceed the threshold level) are read out without turning on the corresponding dual conversion gain gate 64.

Figure 7:
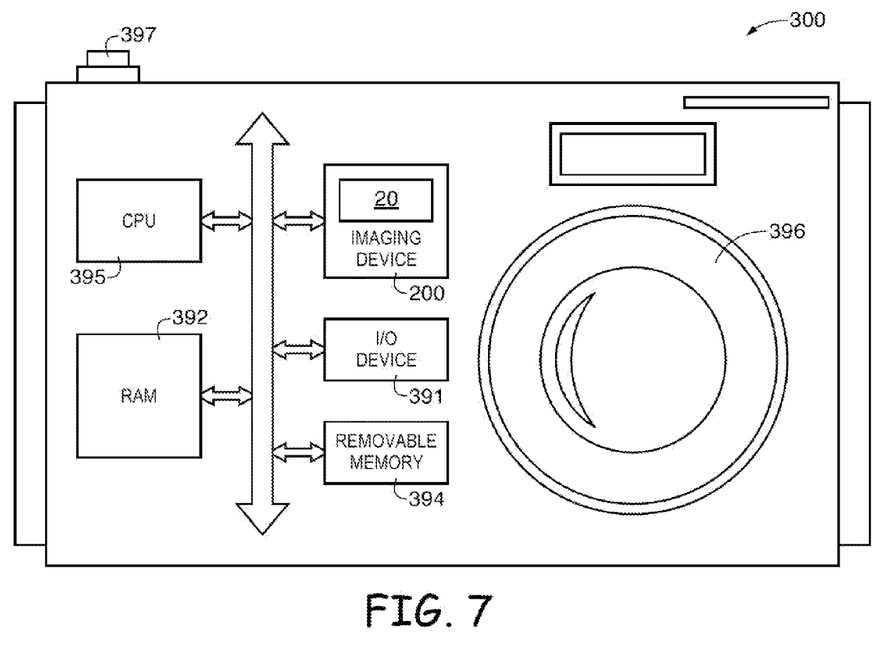
FIG. 7 is a block diagram of a processor system employing the embodiments of FIGS. 1-6 in accordance with an embodiment of the present invention.

FIG. 7 shows in simplified form a typical processor system 300, such as a digital camera, which includes an imaging device 200 (e.g., an imaging device 200 such as device 10 of FIGS. 1-6 and the techniques for capturing images using per-column pixel gain adjustments). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating systems and methods for generating images using an image sensor pixel array having per-pixel gain adjustment capabilities.

An imaging system may include an array of image sensor pixels arranged in rows and columns, row control circuitry coupled to the array via multiple row control lines, and readout circuitry coupled to the array via multiple column lines. The array may include any desired number of image pixels. For example, the array may include first and second image pixels located in two different columns of the array and in a common row of the array. The row control circuitry may assert a row select signal provided to the common row of the array over a corresponding row control line (e.g., to select the pixels in that row for capturing and reading out image signals).

The readout circuitry may include multiple column readout circuits each coupled to a corresponding column of the array. A first column readout circuit may control the first image pixel so that the first image pixel exhibits a first gain while the row control circuitry (continuously) asserts the row select signal to the common row. A second column readout circuit may control the second image pixel so that the second sensor pixel exhibits a second gain that is different from the first gain while the row control circuitry (continuously) asserts the row select signal. For example, the first and second column readout circuits may selectively activate (e.g., selectively turn on and/or off) dual conversion gain gates in the first and second image pixels so that the first and second image pixels exhibit the first and second gains (e.g., first and second conversion gains). Column readout amplifiers may be interposed on each column line. If desired, the first column readout circuit may control a first column readout amplifier coupled to the first image pixel so that the first column readout amplifier exhibits a first desired amplifier gain. The second column readout circuit may control a second column readout amplifier coupled to the second image pixel so that the second column readout amplifier exhibits a second desired amplifier gain.

If desired, the first and second column readout circuits may determine whether to adjust the pixel gain of the respective first and second image pixels based on image signals that are captured by the first and second image pixels. For example, the first readout circuit may turn off a dual conversion gain transistor in the first image pixel and may receive a first image signal from the first image pixel while the dual conversion gain transistor is turned off. The first column readout circuit may compare the received first image signal to a predetermined threshold value and may turn on the dual conversion gain transistor in the first image pixel in response to determining that the first image signal has a magnitude that is greater than the predetermined threshold value. The first column readout circuit may receive a second image signal from the first image pixel while the dual conversion gain transistor is turned on and may generate a final image signal by modifying the second image signal by a pixel gain value associated with the first image pixel. The first column readout circuit may output the final image signal to additional image processing circuitry. If desired, the first column readout circuit may output the first image signal to additional image processing circuitry in response to determining that the first image signal has a magnitude that is less than the predetermined threshold value (e.g., without receiving any image signals while the dual conversion gain transistor is turned on). This process may be independently performed by the second column readout circuit and the second image pixel. In this way, gain may be independently analyzed and adjusted for image pixels across a given row of the array while the given row is selected using independent column readout and control circuits.

If desired, the imaging system may further include a central processing unit, memory, input-output circuitry, and a lens that focuses light onto the array of image sensor pixels.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an imaging system having an array of image sensor pixels arranged in rows and columns, row control circuitry coupled to the array via a plurality of row lines, and readout circuitry coupled to the array via a plurality of column lines, wherein the array comprises first and second image sensor pixels in a given row of the array, the method comprising:
   with the row control circuitry, asserting a row select signal provided to the given row of the array over a corresponding one of the plurality of row lines;
   with the readout circuitry, providing a first gain control signal to a gate terminal of a first gain control transistor to operate the first image sensor pixel in a first gain mode while the row control circuitry asserts the row select signal, wherein the first gain control signal is provided via a first column line of the plurality of column lines; and
   with the readout circuitry, providing a second gain control signal to a gate terminal of a second gain control transistor to operate the second image sensor pixel in a second gain mode different from the first gain mode while the row control circuitry asserts the row select signal, wherein the second gain control signal is provided via a second column line of the plurality of column lines.

2. The method defined in claim 1, wherein the readout circuitry is coupled to the first image sensor pixel by the first column line of the plurality of column lines, wherein the readout circuitry is coupled to the second image sensor pixel by the second column line of the plurality of column lines, wherein a first readout amplifier circuit is interposed on the first column line, and wherein a second readout amplifier circuit is interposed on the second column line, the method further comprising:
   with the readout circuitry, instructing the readout amplifier circuit to exhibit a first amplifier gain; and
   with the readout circuitry, instructing the readout amplifier circuit to exhibit a second amplifier gain that is different from the first amplifier gain.

3. The method defined in claim 1, wherein the first gain control transistor comprises a dual conversion gain transistor, the method further comprising:
   with the readout circuitry, turning off the dual conversion gain transistor in the first image sensor pixel; and
   with the readout circuitry, receiving a first image signal from the first image sensor pixel while the dual conversion gain transistor is turned off.

4. The method defined in claim 3, further comprising:
   with the readout circuitry, comparing the first image signal to a predetermined threshold value; and
   with the readout circuitry, turning on the dual conversion gain transistor in the first image sensor pixel in response to determining that the first image signal has a magnitude that is greater than the predetermined threshold value.

5. The method defined in claim 4, further comprising:
   with the readout circuitry, outputting the first image signal to image processing circuitry in response to determining that the first image signal has a magnitude that is less than the predetermined threshold value.

6. The method defined in claim 4, further comprising:
   with the readout circuitry, receiving a second image signal from the first image sensor pixel while the dual conversion gain transistor is turned on;
   with the readout circuitry, generating a final image signal by modifying the second image signal based on a pixel gain value associated with the first image sensor pixel; and
   with the readout circuitry, outputting the final image signal to image processing circuitry, wherein the pixel gain value comprises a ratio of a conversion gain of the first image sensor pixel while the dual conversion gain transistor is turned off to a conversion gain of the first image sensor pixel while the dual conversion gain transistor is turned on and wherein modifying the second image signal based on the pixel gain value comprises:
      dividing the second image signal by the pixel gain value.

7. The method defined in claim 1, wherein the first image sensor pixel comprises a charge storage region, a plurality of capacitors, and a plurality of gain control transistors, wherein each capacitor of the plurality of capacitors is coupled to the charge storage region via a respective gain control transistor of the plurality of gain control transistors, the method further comprising:

providing additional gain control signals to each of the gain control transistors of the plurality of dual conversion gain gates to turn off the gain control transistors.

8. The method defined in claim 1, wherein the first image sensor pixel comprises a charge storage region and a capacitor coupled to the charge storage region via the first gain control transistor, wherein providing the first gain control signal to the gate terminal of the first gain control transistor comprises:

providing the first gain control signal to the first gain control transistor to turn off the first gain control transistor.

9. The method defined in claim 8, wherein the second image sensor pixel comprises an additional charge storage region and an additional capacitor coupled to the additional charge storage region via the second gain control transistor, wherein providing the second gain control signal to the gate terminal of the second gain control transistor comprises:

providing the second gain control signal to the second gain control transistor to turn on the second gain control transistor while the first gain control transistor is turned off.

10. An imaging system, comprising:

an array of image sensor pixels arranged in rows and columns, wherein the array comprises a first image sensor pixel having a first dual conversion gain gate coupled to a first charge storage node and a second image sensor pixel having a second dual conversion gain gate coupled to a second charge storage node;

a first column control circuit coupled to a first column of the array, wherein the first image sensor pixel is located in the first column, and wherein the first column control circuit is configured to selectively provide a first control signal to a gate terminal of the first dual conversion gain transistor in the first image sensor pixel; and a second column control circuit that is different from the first column control circuit, wherein the second column control circuit is coupled to a second column of the array, wherein the second image sensor pixel is located in the second column, and wherein the second column control circuit is configured to selectively provide a second control signal to a gate terminal of the second dual conversion gain transistor in the second image sensor pixel.

11. The imaging system defined in claim 10, further comprising:

a first color filter element formed over the first image sensor pixel, wherein the first image sensor pixel receives image light of a first color from an imaged scene; and a second color filter element formed over the second image sensor pixel, wherein the second image sensor pixel receives image light of a second color that is different from the first color from the imaged scene.

12. The imaging system defined in claim 10, wherein the first column control circuit is coupled to the first column via a first column line, wherein the second column control circuit is coupled to the second column via a second column line, further comprising:

row control circuitry coupled to the array via a plurality of row control lines, wherein the row control circuitry is configured to provide row control signals to the image sensor pixels in the array over the plurality of row control lines.

13. The imaging system defined in claim 12, wherein the first and second image sensor pixels are located in a given row of the array that is coupled to the row control circuitry by a given row control line of the plurality of row control lines and wherein the row control circuitry is configured to provide row select control signals to the first and second image sensor pixels over the given row control line.

14. The imaging system defined in claim 13, wherein the first charge storage node of the first image sensor pixel is coupled to the first column line by a first row select gate, wherein the second charge storage node of the second image sensor pixel is coupled to the second column line by a second row select gate, wherein the row control circuitry is configured to turn on the first and second row select gates by concurrently providing the row select control signals to the first and second row select gates, wherein the first column control circuit is configured to selectively provide the first control signal to the gate terminal of the first dual conversion gain transistor in the first image sensor pixel while the first row select gate is turned on, and wherein the second column control circuit is configured to selectively provide the second control signal to the gate terminal of the second dual conversion gain transistor in the second image sensor pixel while the second row select gate is turned on.

15. The imaging system defined in claim 10, wherein the first column control circuit is configured to readout a first image signal from the first image sensor pixel while the first dual conversion gain transistor is deactivated and wherein the first column control circuit is configured to selectively activate the first dual conversion gain transistor based on the first image signal.

16. The imaging system defined in claim 15, wherein the first column control circuit comprises:

comparator circuitry, wherein the comparator circuitry is configured to compare the first image signal to a selected threshold level.

17. The imaging system defined in claim 16, wherein the first column control circuit is configured to activate the first dual conversion gain transistor in response to determining that the first image signal has a magnitude that exceeds the selected threshold level, wherein the first column control circuit is configured to readout a second image signal from the first image sensor pixel while the first dual conversion gain transistor is activated, wherein the second column control circuit is configured to read out a third image signal from the second image sensor pixel while the second dual conversion gain transistor is deactivated, wherein the second column control circuit comprises additional comparator circuitry configured to compare the third image signal to an additional selected threshold level, wherein the second column control circuit is configured to activate the second dual conversion gain transistor in response to determining that the third image signal exceeds the additional selected threshold, and wherein the second column control circuit is configured to readout a fourth image signal from the second image sensor pixel while the second dual conversion gain transistor is activated.

18. A system, comprising:
a central processing unit;
memory;
input-output circuitry; and
an imaging device, wherein the imaging device comprises:

an array of image sensor pixels arranged in rows and columns, wherein the array comprises a first image sensor pixel located in a first column and a given row of the array and a second image sensor pixel located in a second column and the given row of the array;

row control circuitry coupled to the given row of the array via a row control line;

a first readout circuit coupled to the first column of the array via a first column line; and a second readout circuit coupled to the second column of the array via a second column line, wherein, while the row control circuitry continuously activates the given row of the array, the first readout circuit is configured to selectively activate a first dual conversion gain transistor of the first image sensor pixel by asserting a first control signal provided to a gate terminal of the first dual conversion gain transistor, and the second readout circuit is configured to selectively activate a second dual conversion gain transistor of the second image sensor pixel by asserting a second control signal provided to a gate terminal of the second dual conversion gain transistor, wherein a first image signal captured by the first image sensor pixel while the first dual conversion gain transistor is deactivated determines whether the first dual conversion transistor is selectively activated.

* * * * *